G. S. COATS.
KEY SEATING TOOL.
APPLICATION FILED APR. 17, 1915.
1,239,159.
Patented Sept. 4, 1917.
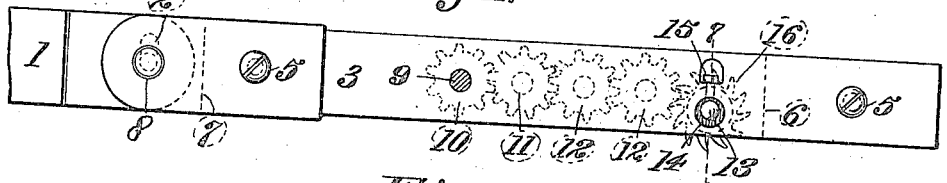
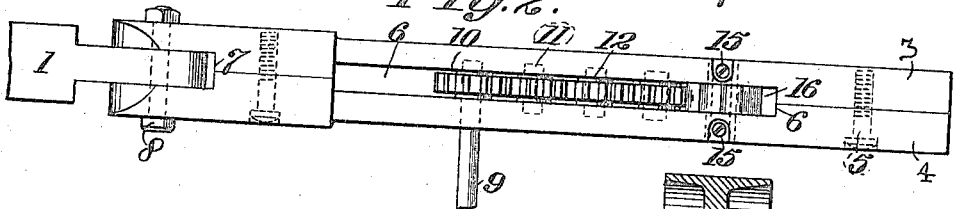
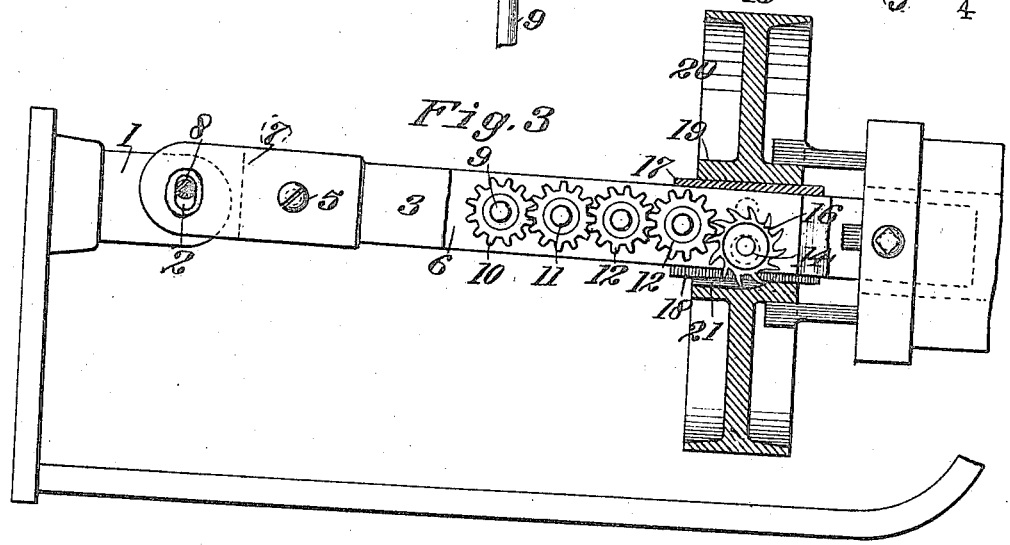
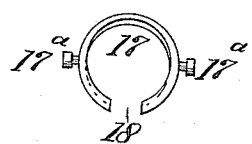
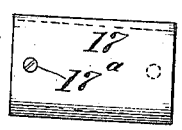
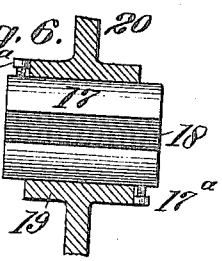
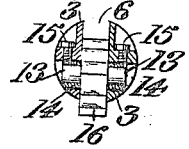
WITNESSES:
Charles Pickles
Dorothy Weiss
INVENTOR
George S. Coats,
Strong & Townsend
BY
ATTORNEYS

UNITED STATES PATENT OFFICE.

GEORGE S. COATS, OF VISALIA, CALIFORNIA.

KEY-SEATING TOOL.

1,239,159. Specification of Letters Patent. Patented Sept. 4, 1917.

Application filed April 17, 1915. Serial No. 22,099.

*To all whom it may concern:*

Be it known that I, GEORGE S. COATS, a citizen of the United States, residing at Visalia, in the county of Tulare and State of California, have invented a new and useful Key-Seating Tool, of which the following is a specification.

The invention contemplates an improved tool for cutting a key seat in wheels, gears, bushings and the like, and it is particularly adapted to be used in conjunction with the chuck and carriage of a machine such as a lathe, and may be applied to such machine to cut the key seat in the work without removing the work from the machine.

The invention further comprises improved means for cutting either a straight or an inclined key seat in the work.

The invention is illustrated in the accompanying drawing in which—

Figure 1 is a side elevation of the tool.

Fig. 2 is a bottom plan view of the tool.

Fig. 3 is a view illustrating the operation of the tool applied to a lathe to cut an inclined key seat in a pulley, the pulley and the tool guide bushing being shown in section.

Fig. 4 is an end view of the guide bushing for the tool which is used to cause the tool to cut an inclined key seat in the work.

Fig. 5 is a side view of said bushing.

Fig. 6 is a side view of said bushing and illustrating how the work is attached thereto, the work being shown in section.

Fig. 7 is a cross section on line 7—7 of Fig. 1.

Referring now more particularly to the characters of reference on the drawings, the numeral 1 designates a holder or support for the tool, which is shaped in any suitable manner to fit into the tool post or tail stock of the lathe or other suitable supporting carriage. At its forward end this member 1 is provided with a transverse oblong slot 2 which is of importance for a purpose as will presently appear. The tool proper consists primarily of a frame constructed in any suitable manner, but preferably made up of two sides 3 and 4 suitably connected together at each end by countersunk screws or bolts 5. The members 3—4 are cut out or recessed for a portion of their length to form an intermediate slot 6. The said frame 3—4 is suitably connected with the holder 1 by means of a slot 7 which receives the end of the holder 1, there being a bolt 8 projecting through the member 3—4 and the slot 2 by means of which the said frame 3—4 may be suitably tightened on the holder 1.

The numeral 9 designates the driving shaft which is suitably journaled in the frame 3—4 and projects across the slot 6 where it is provided with a keyed driving gear 10. The numeral 11 designates a train of stub shafts journaled in the member 3—4 and each projecting across the slot 6, there being a gear 12 mounted on each shaft 11, the said gears 10 and 12 intermeshing in successive order to form a train of gears.

The numeral 13 designates the cutter shaft located near the other terminal of the slot 6 which projects into eccentric bushings 14 disposed in the side walls of the slot 6, such bushings being held against undesired rotation by means of set screws 15. By means of these eccentric bushings, the shaft 13 can be positioned to compensate for the wear on the cutter gear. This cutter gear 16 is mounted on the shaft 13 and the teeth are profiled on the driven side, the same as are gears, and engage the last of the gears 12 in order to impart rotation to the gear 16. The other profile of the teeth of the gear 16 is sharpened in a manner similar to a milling cutter. The said teeth on the gear 16 project beyond one side of the frame 3—4, while the gears 10 and 12 are preferably contained within the slot 6 so as to be out of the way of any possible interference of the work. The structure just described is that which is preferably constructed for use in connection with the lathe or similar supporting carriage and when used, the operation is as follows, namely:

The holder 1 is suitably secured in the tool post or tail stock of the lathe or in any other suitable carriage. Power is then applied to the shaft 9 in any suitable manner either by flexible shaft connections connected up with the running gear of the lathe or other carriage, or having an independent driving means. This power is transmitted through the shaft 9 to the gear 10 and thence through the train of gears 12 to the cutter gear 16. Hence, without removing the work in which the key seat is to be cut, my improved tool can be advanced into the work and the operation of the cutter gear 16 suitably guided will cut the desired key seat.

For cutting perfectly horizontal key seats, the member 3—4 will be longitudinally alined with the member 1. When tapered key seats are to be cut however, I provide an auxiliary bushing 17, the inner wall of which is disposed obliquely with respect to its longitudinal axis, such bushing 17 being provided with a slot 18 along one side thereof. When a tapered slot is to be cut into the work as in a hub 19 on a pulley 20, the auxiliary bushing 17 is inserted in the hub 19. The outer circumference of the said bushing 17 is concentric with the inner circumference of the hub 19, which will cause the inner circumference of the said bushing 17 to be oblique or eccentric with respect to the inner circumference of the said hub 19. When the bushing 17 is in place within the hub 19, the slot 18 will be positioned adjacent that point at which it is desired to cut the key seat 21 in the said hub 19. The bushing will be held against displacement from the hub 19 by means of two set screws 17$^a$ disposed one at each end of said bushing outside of the hub 19 so as to engage the hub to prevent said bushing from slipping out of the hub. When the bushing is suitably positioned in the hub as described, the cutter frame 3—4 is then projecting into the bushing 17 to bring the cutter 16 into alinement with the slot 18 so that when the said frame is advanced through the bushing 17, this cutter will cut the key seat 21.

It is necessary, of course, that the said frame 3—4 be guided in alinement with the axis of the inner periphery of the bushing 17 in order that as the cutter 16 is advanced through the bushing it will cut the tapered key seat 21. This alinement is accomplished by loosening the bolt 8 and moving it through the slot 2 as shown in Fig. 3, until the cutter is ready for movement through the bushing 17 in such axial alinement with the result that the cutter 16 will cause the key seat 21 to be tapered. As the tool is moved forward and is guided downwardly at an angle by the inner surface of the bushing, the forward end of the tool moves downwardly in a vertical direction, which latter movement is permitted by the slot 2 through which the bolt 8 extends.

From the foregoing description it can readily be seen that I have provided a simple and efficient key seating tool for internal work by means of which the key seats may be cut in the work without removing them from the carriage in which they are placed, my improved tool embodying a novel cutter structure and a novel and improved method of driving the same thereof by connection with the driving power of the carriage in which the tool may be placed, or by independent power, as may be found most desirable.

It will further be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is—

1. A tool for the purpose described comprising a support for engagement with any suitable carriage, said support being provided with a transverse slot, a body member hinged to such support, such hinge comprising a bolt projecting through the body member and such transverse slot, a rotating cutter carried by the body member and a train of gears carried by the body member and arranged for driving the cutter.

2. A tool for the purpose described comprising a support for engagement with any suitable carriage, said support being provided with a transverse slot, a body member hinged to such support, such hinge comprising a bolt projecting through the body member and such transverse slot, a rotating cutter carried by the body member, a train of gears carried by the body member and arranged for driving the cutter, and means for guiding said body member and cutter downwardly with relation to said support.

3. In combination, a tool for cutting key seats comprising a body member, a support, a connection for connecting said body member to said support, a cutter on said body member, means for operating said cutter and means adapted to be placed on the work for guiding said body member and said cutter in a downward direction, said connection being constructed and arranged to permit downward movement of the cutter and body member as said support is moved horizontally to move said body member and cutter correspondingly.

4. In combination, a rotary tool for cutting key seats, means for holding the work straight, means for moving said tool forwardly for cutting a key seat in the work, and means for directing the course of said tool so as to cut an inclined key seat.

5. In combination, a tool for cutting key seats, a support adapted to be attached to a carriage, means for connecting said tool to said support, said connecting means being constructed and arranged to permit the tool to move at an angle with relation to said support as said tool is moved forwardly, means for holding the work in alinement with the line of movement of said carriage, a bushing adapted to be placed in the work to receive said tool, the bushing being adapted to rest in the work in alinement with the axis of movement of said carriage, the inner surface of said bushing being inclined to guide the tool at an angle as the tool is moved forwardly therein so that the tool will cut the key seat at an angle in the work.

6. In combination, a tool for cutting key seats, a support adapted to be attached to a carriage, means for connecting said tool to said support so that as said tool is moved forwardly by said carriage, the tool may also move downwardly at an angle with relation to said support, a bushing adapted to be placed in the work to receive said tool and to permit said tool to cut a key seat in the work, the inner surface of said bushing being inclined to guide said tool at an angle so that the tool will cut the key seat at an angle in the work, and set screws in said bushing adapted to engage the work to hold the bushing in the work.

7. A tool for cutting key seats comprising a body member, a rotary toothed cutter mounted in said body member, a pinion meshing with said cutter, means for rotating said pinion to rotate said cutter, and means for adjusting the centers of said cutter and pinion with relation to each other to take up wear between the teeth thereof and means for mounting and actuating said tool so that said cutter will cut a key seat in the work.

8. A tool for cutting key seats comprising a body member, cylindrical bushings journaled in said body member, a stud journaled eccentrically in said bushings, a rotary toothed cutter secured on said stud, a pinion meshing with said cutter, means for rotating said pinion to rotate said cutter, said bushing being adapted to be turned in said body member to adjust said cutter to take up wear between the teeth thereof and the teeth of said pinion, and set screws in said body member for engaging said bushings to lock said cutter in adjusted position and means for mounting and actuating said tool so that said cutter will cut a key seat in the work.

In testimony whereof I affix my signature.

GEORGE S. COATS.

Copies of this patent may be obtained for five cents each, by addressing the "Commissioner of Patents, Washington, D. C."